United States Patent [19]

Ohshima et al.

[11] Patent Number: 4,668,833
[45] Date of Patent: May 26, 1987

[54] HYDROGENATION OF ACETYLENE CONTAINED IN HYDROGEN CHLORINE GAS, AND APPLICATION THEREOF

[75] Inventors: Hiroshi Ohshima, Kobe; Osamu Kakimoto, Himeji, both of Japan

[73] Assignee: Kanegafuchi Chemical Industry Co., Ltd., Osaka, Japan

[21] Appl. No.: 858,563

[22] Filed: Apr. 24, 1986

Related U.S. Application Data

[63] Continuation of Ser. No. 428,810, Sep. 30, 1982, abandoned, which is a continuation of Ser. No. 193,126, Oct. 2, 1980, abandoned.

[30] Foreign Application Priority Data

Oct. 4, 1979 [JP] Japan ................... 54-128556

[51] Int. Cl.$^4$ ........................................... C07C 17/156
[52] U.S. Cl. ..................... 570/241; 570/243; 423/245; 423/488
[58] Field of Search ................. 570/241, 243; 423/245 S, 488; 585/251, 273

[56] References Cited

U.S. PATENT DOCUMENTS 1,836,927 12/1931 Linckh et al. ............. 423/245 S
3,175,884 3/1965 Kuhn ........................ 423/345
3,488,398 4/1964 Harpring et al. ............ 570/243
4,206,188 6/1980 Megerle ..................... 570/243

FOREIGN PATENT DOCUMENTS 1173455 6/1957 Fed. Rep. of Germany ... 423/245 S
2438153 5/1976 Fed. Rep. of Germany ...... 423/488
9522 6/1968 Japan .
71607 4/1975 Japan .
11898 12/1979 Japan .

Primary Examiner—Natalie Trousof
Assistant Examiner—Joseph A. Boska
Attorney, Agent, or Firm—Armstrong, Nikaido, Marmelstein & Kubovcik

[57] ABSTRACT

A process for hydrogenating acetylene in hydrogen chloride gas using the catalytic palladium supported on silicon carbide carrier whose iron content is specified to be not more than 1,000 ppm. The catalyst has the advantages of enhancing the conversion of acetylene into ethylene, improving the selectivity of ethylene, and retaining catalytic activity over a long time at a large space velocity. This process can be effectively applied to the hydrogenation of acetylene in hydrogen chloride gas separated from the thermally decomposed products of 1,2-dichloroethane which occurs in the production of vinyl chloride; namely, the hydrogen chloride gas that contains thus hydrogenated acetylene (ethylene) can be recycled in such an effective way that 1,2-dichloroethane can be produced economically.

6 Claims, 1 Drawing Figure

CHANGE OF CATALYTIC ACTIVITY

CHANGE OF CATALYTIC ACTIVITY

HYDROGENATION OF ACETYLENE CONTAINED IN HYDROGEN CHLORINE GAS, AND APPLICATION THEREOF

This application is a continuation of application Ser. No. 428,810 filed Sept. 30, 1982, abandoned, which is a continuation of application Ser. No. 193,126, filed Oct. 2, 1980, abandoned.

BACKGROUND OF THE INVENTION

The present invention relates to a modified process for selectively hydrogenating acetylene contained in hydrogen chloride gase. More specifically, the present invention also pertains to a modified process for producing 1,2-dichloroethane by subjecting the hydrogen chloride gas mentioned above to oxychlorination reaction of ethylene.

In the commerical production of vinyl chloride, 1,2-dichloroethane is decomposed at an elevated temperature so as to form vinyl chloride and hydrogen chloride. The hydrogen chloride is subsequently separated from the vinyl chloride to be subjected to an oxychlorination reaction together with ethylene, and oxygen or air in order to produce 1,2-dichloroethane economically. In this recycling system, hydrogen chloride gas, resulting from the thermal decomposition of 1,2-dichloroethane, ordinarily contains a few thousands parts per million (ppm) of acetylene, which is converted into dichloroethylene, trichloroethylene, tetrachloroethane and others in the oxychlorination reaction; as a result, these products diminish the quality of the produced 1,2-dichloroethane. Particularly, trichloroethylene is so difficult to remove from 1,2-dichloroethane by distillation that it brings about the thermal decomposition of 1,2-dichloroethane, which becomes the cause of delay in the reaction of generating vinyl chloride. Therefore, acetylene, when contained in hydrogen chloride gas, wastefully consumes hydrogen chloride in the oxychlorination reaction, and deteriorates the purity of the produced 1,2-dichloroethane.

Because acetylene is difficult to separate from hydrogen chloride by means of a simple physical operation such as distillation, chemical processes have been applied to separate them from one another. For example, there is a process disclosed in Japanese Laid Open Pat. No. 11898/1979 (Dow Chemical) by which acetylene is converted into chlorinated derivatives being heated to 300°–500° C. in the presence of oxygen. According to this process, not only is hydrogen chloride consumed wastefully but also the reaction needs to be conducted at an elevated temperature; consequently, this process is not preferable economically and brings about corrosion of the reaction equipment.

In contrast thereto, a conversion process of acetylene into ethylene can be considered to save the wasteful consumption of hydrogen chloride and contribute to the improvement of the reaction so that this process must be more advantageous than the former. In regard to this, a process has been publicly known, which utilizes palladium or platinum supported on alumina or silica (Japanese Patent Publication No. 9522/1968, Goodrich). According to the process, the reaction is conducted according to the following conditions: temperature, 125°–175° C.; molar ratio of hydrogen to acetylene, (1–6.6):1; space velocity (volume of gas current/volume of catalyst/time), 2,000–3,000. To be concrete, the palladium catalyst supported on alumina carrier ordinarily requires a space velocity of about 2,000 $hr^{-1}$. Additionally, it has been also said about the process that not only is much catalyst needed because of the low activity but also the selectivity of ethylene is as low as about 50%. In the case of the palladium catalyst supported on highly pure silica carrier with specific surface area of 3 $m^2/g$ or less as in West Germany Laid Open Pat. No. 2438153 (Degussa), it has been said that, although the selectivity of ethylene is 60–70% and the life of the catalyst lasts more than one year, the process is still economically not so desirable, when taking it into account that the space velocity is limited to about 2,000 $hr^{-1}$, and much catalyst is wastefully consumed.

SUMMARY OF THE INVENTION

The present invention relates to a process for obtaining hydrogen chloride gas suited for the oxychlorination reaction. This is accomplished by hydrogenating acetylene contained in the hydrogen chloride gas, into ethylene, using a catalyst prepared by depositing palladium on silicon carbide carrier in which the iron content is particularly specified not to exceed 1,000 ppm. Namely, by the use of the catalyst, which is prepared by depositing an appropriate amount of palladium on silicon carbide of which iron content is reduced to 1,000 ppm or less (preferably, 600 ppm or less) through a treatment in hydrochloric acid, the selectivity of ethylene, as high as 65 to 80% in average, and the conversion of acetylene, as high as 70 to 100%, can be realized, even when hydrogen chloride gas containing a few thousands ppm of acetylene is made to pass through the reaction tube at a space velocity as large as more than 5,000 1/1/hr, or 5,000 to 10,000 1/1/hr.

This invention can be applied to the hydrogen chloride gas containing acetylene, which is separated from thermally decomposed products of 1,2-dichloroethane to provide for the production of vinyl chloride. By choosing optimal condition as to every operational factor, such as space velocity, quantitative proportion of palladium to silicon carbide carrier, molar ratio of hydrogen to acetylene, and others, a continuous reaction extending over 3,000 hours becomes possible while keeping the conversion into ethylene more than 50 percent, and the selectivity of ethylene 65–80 percent.

DETAILED DESCRIPTION OF THE INVENTION

Figure 1:
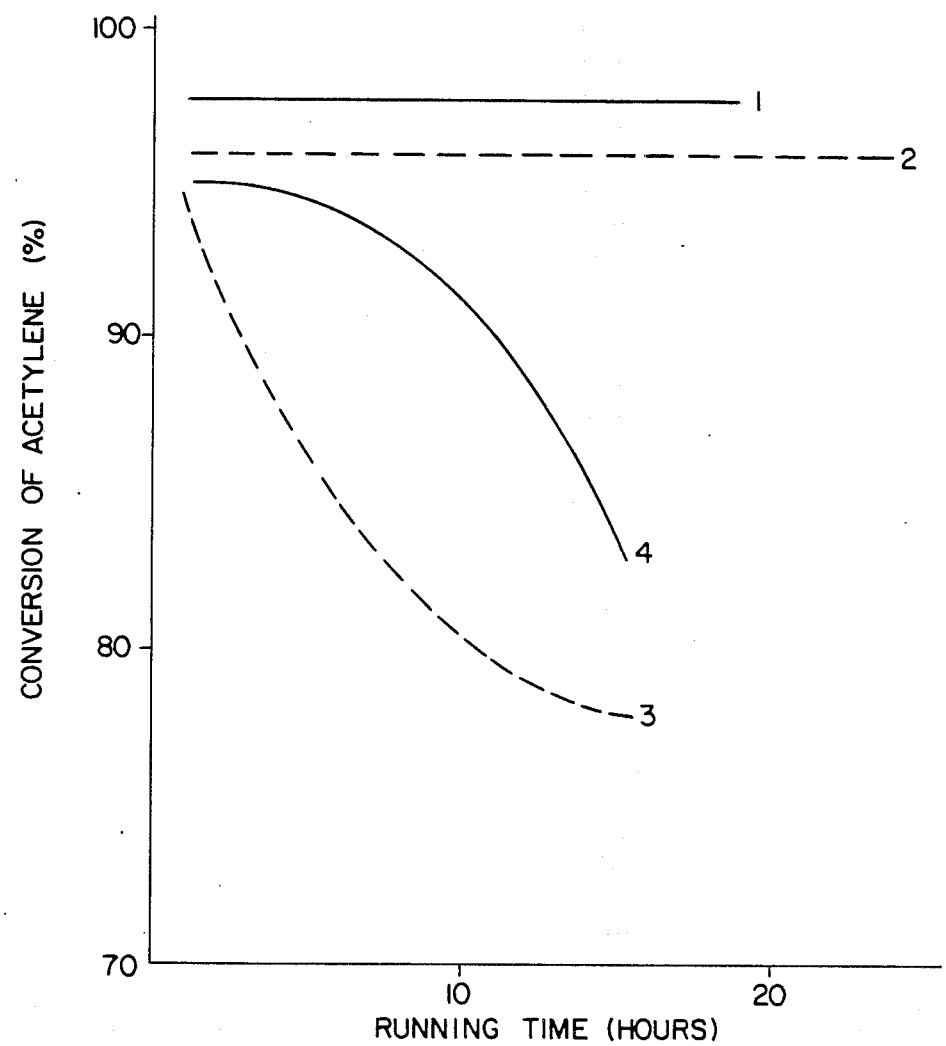
FIG. 1 illustrates a graph showing the change of the catalytic activity in the course of time.
1. Iron content: 120 ppm
2. Iron content: 500 ppm
3. Iron content: 1100 ppm
4. Iron content: 1500 ppm

The present inventors have intensively studied to eliminate the above drawbacks of the prior art overcoming difficulties, and finally accomplished the present invention. The present invention pertains to a process for improving the utility of hydrogen chloride gas containing acetylene by hydrogenating acetylene in said hydrogen chloride gas, which is charactrized by employing a catalyst which is prepared by depositing palladium on silicon carbide of which iron content is not more than 1,000 parts per million. Moreover, the present invention concerns a process for producing 1,2-dichloroethane, which is characterized by subjecting to oxychlorination, a hydrogen chloride gas having undergone the hydrogenation of acetylene contained therein employing a catalyst which is prepared by depositing palladium on silicon carbide of which iron content is not more than 1,000 parts per million.

It has been widely known to use silicon carbide as a carrier for a catalytic reaction. Nvertheless, the present inventors have found that there is still a problem to be solved when silicon carbide is provided for the process of this invention. Generally, it is difficult to prevent iron from being incorporated with silicon carbide, considering the production process of silicon carbide. When the catalyst, supported on silicon carbide which contains iron is used, the catalyst carbonizes acetylene on the surface of it so that the catalytic activity gradually falls because of the carbon deposit thickening with the passage of time.

In order to prevent the falling of the catalytic activity, the iron content in silicon carbide has to be not more than 1,000 ppm; particularly, it is preferred to be 600 ppm or less. When silicon carbide contains more than 1,000 ppm of iron, the silicon carbide, according to the present invention, is treated with boiling 20% hydrochloric acid solution for a few hours to remove the iron therefrom. In spite of being simple, this process proves to be effective.

Particles of the carrier are generally 2-6 mm in size; they are preferred to be 3-5 mm in particular. The smaller the size of particles, the larger the apparent catalytic activity becomes. But when the size of particles is too small, this will cause the pressure drop to increase and leads to disadvantage.

The activity of the catalyst also becomes large as the amount of palladium deposited on silicon carbide increases. However, the amount of palladium is generally 0.1-0.5 percent by weight, and it is preferred to be present between 0.1-0.3 percent by weight. When the amount of palladium does not exceed 0.1 percent by weight, the catalytic activity will be too small. On the other hand, when it exceeds 0.5 percent by weight, an increase in the catalytic activity is not desired any more. Palladium being expensive, the amount of it determines the economy of the process. Palladium can be deposited on silicon carbide according to conventional processes. For instance, to deposit palladium on silicon carbide, silicon carbide is soaked in a hydrochloric solution containing palladium chloride, and dried at 150°-200° C.; subsequently, absorbed palladium chloride is reduced by hydrogen for a couple of hours.

The hydrogenation of acetylene by the use of this catalyst can be carried out generally according to the following conditions: reaction temperature, 100°-200° C. (preferably, 120°-180° C.); space velocity (volume at STP of gas current/volume of catalyst/time), 5,000-20,000 1/1/hr (preferably, 5,000-10,000 1/1/hr, although this depends on the reaction presure); reaction pressure, an atmospheric pressure—20 atm.

The application of this invention improves the catalytic activity, prolongs the life of the catalyst and saves the amount of palladium. Moreover, owing to the high selectivity of ethylene, an economic advantage will become great. The embodiment of the present invention will be explained more in detail according to examples as below.

EXAMPLE 1-3

In a reaction tube, 24 mm in inner diameter and 60 cm in length, with a jacket filled with polyethylene glycol was packed the catalysts and Raschig rings. The temperature of the catalyst was adjusted by means of electric heating wires wound on the jacket. The catalysts prepared by depositing 0.1, 0.15, and 0.20% by weight of palladium on silicon carbide particles of 4 mm in size, were packed in the reaction tube by 25 ml respectively leaving an upper and a lower margin where Raschig rings of 5 mm in diameter were filled.

In the meantime, the iron content in the silicon carbide proved to be 120 ppm through analysis. Acetylene was mixed into hydrogen chloride gas in an amount of 0.4% in molar ratio. Subsequenty, hydrogen was blended with this mixture so as to make the molar ratio of hydrogen to acetylene 4 to 1. The gas thus prepared was made to flow at a rate of 6,000 1/1/hr through the reaction pipe. The reaction temperatue was kept at 135° C. The gas coming out of the reaction tube was analysed utilizing gas chromatography. Table 1 shows the result.

COMPARATIVE EXAMPLE 1-2

The commercially available catalysts, α-alumina coated with 0.04% and 0.1% of palladium respectively, were provided to the test in the same way as in Examples 1 to 3. All other conditions except for catalyst were left unchanged. The result is shown in Table 1, together with those of Examples 1 to 3.

TABLE 1

|  | Example | | | Comparative Example | |
|---|---|---|---|---|---|
|  | 1 | 2 | 3 | 1 | 2 |
| Carrier | SiC | | | α-Alumina | |
| Amount of Pd (% wt.) on carrier | 0.1 | 0.15 | 0.2 | 0.04 | 0.10 |
| Conversion of acetylene (%) | 70 | 84 | 73 | 63 | 67 |
| Selectivity of ethylene (%) | 70 | 75 | 72 | 40 | 50 |

The intial concentration of acetylene was 4,000 ppm.

EXAMPLE 4

The commercially available silicon carbide proved to contain 1,500 ppm of iron. The silicon carbide was put in a boiling 20% hydrochloric acid solution to reduce the iron content. After that, the silicon carbide was rinsed in hydrochloric acid so as to adjust the iron content to 500, and 1,100 ppm respectively. The catalysts were prepared by equally depositing 0.15% of palladium on the two kinds of silicon carbide just mentioned. The catalytic action in the course of time was examined. The result is shown in FIG. 1, together with that of Example 2. In FIG. 1, numerals 1, 2, 3 and 4 identify the results for the use of palladium catalysts supported on silicon carbide having iron contents of 120 ppm, 500 ppm, 1100 ppm and 1500 ppm, respectively. The reaction condition in Example 1 was kept unchanged except that the reaction temperature was set to 145° C.

EXAMPLE 5

To the outside of a reaction tube of nickel, 1 inch in inner diameter and 1.2 m in length, was attached an iron jacket, through which steam was made to pass to control the reaction temperature. The catalyst of Example 2 was packed in the reaction tube in an amount of 150 ml. Hydrogen was mixed into hydrogen chloride gas resulting from the thermal decomposition of 1,2-dichloroethane at 490° C. Acetylene proved to be contained in the hydrogen chloride gas by 2,500 ppm in average. Hydrogenation was performed according to the following conditions: molar ratio of $H_2$ to $CH\equiv CH$, abort 4/1; space velocity, 6,000 1/1/hr; pressure, 7.0 atm. Table 2 shows the result.

The hydrogen chloride gas subjected to the hydrogenation was subjected to the oxychlorination reaction, together with ethylene and air, in the presence of catalytic copper chloride to produce 1,2-dichloroethane. The purity of this 1,2-dichloroethane increased by 0.5–0.6%, compared with the case when hydrogen chloride gas without hydrogenation was used. The oxychlorination reaction was conducted using the fixed catalyst bed which had been prepared by depositing 18% of copper chloride and 2% of potassium chloride on activated alumina.

The material gas for oxychlorination reaction, made up by mixing into 2 mole of hydrogen chloride 1.1 mole of ethylene and 2.62 mole of air, was made to pass through the reaction tube at 230°–290° C. under 4–6 atm. Three reactors were connected in a series; therefore, air was divided into three equal parts to supply to the reactors. The space velocity in each reactor was 800–1,000 1/1/hr. In order to collect 1,2-dichloroethane, the gas having passed the reactors was cooled at their end and a portion of the collected 1,2-dichloroethane was subjected to gas-chromatography for analysis.

In this example, the explanation is made as to the fixed catalyst bed; however, it is needless to say that the present invention can also be applied to the oxychlorination reaction by means of a fluidized catalyst bed.

TABLE 2

| Running hour | Molar ratio of $H_2/C_2H_2$ | Gas temperature at the end of the reactors (°C.) | Conversion of $C_2H_2$ (%) | Selectivity of $C_2H_4$ (%) |
| --- | --- | --- | --- | --- |
| 3 | 4.0 | 140 | 96 | 66 |
| 100 | 4.0 | 136 | 83 | 66 |
| 550 | 4.0 | 140 | 84 | 77 |
| 580 | 3.5 | 169 | 96 | 66 |
| 1020 | 3.4 | 168 | 99 | 68 |
| 2400 | 3.7 | 161 | 98 | 72 |
| 3130 | 4.0 | 163 | 95 | 73 |

What is claimed is:

1. A process for hydrogenating acetylene in hydrogen chloride gas, which comprises passing hydrogen and said hydrogen chloride gas containing acetylene over a catalyst which is prepared by depositing palladium on silicon carbide of which iron content is not more than 500 parts per million.

2. A process for producing 1,2-dichloroethane which comprises hydrogenating acetylene contained in hydrogen chloride gas using a catalyst which is prepared by depositing palladium on silicon carbide of which iron content is not more than 500 parts per million, and subjecting the resultant hydrogen chloride gas, together with ethylene and oxygen or air, to an oxychlorination reaction to produce 1,2-dichloroethane.

3. A process as claimed in claim 1 or 2, wherein the acetylene was obtained during the thermal decomposition of 1.2-dichloroethane.

4. A process as claimed in claim 1 or 2 in which the percentage by weight of palladium to silicon carbide carrier is present between 0.1 and 0.5.

5. A process as claimed in claim 1 or 2 in which silicon carbide particles used as carrier are 2 to 6 millimeters in size.

6. A process as claimed in claim 1 or 2 in which the hydrogenation of acetylene contained in hydrogen chloride gas is carried out in the following conditions: molar ratio of hydrogen to acetylene, 1–6:1; space velocity, 5,000–10,000 1/1/hr; reaction temperature, 100°–190° C.; and pressure, 4–10 atm.

* * * * *